April 26, 1955     C. L. JACKSON     2,707,089
UNIVERSAL CLAMP-ON FISHING ROD HOLDER
Filed Aug. 28, 1953
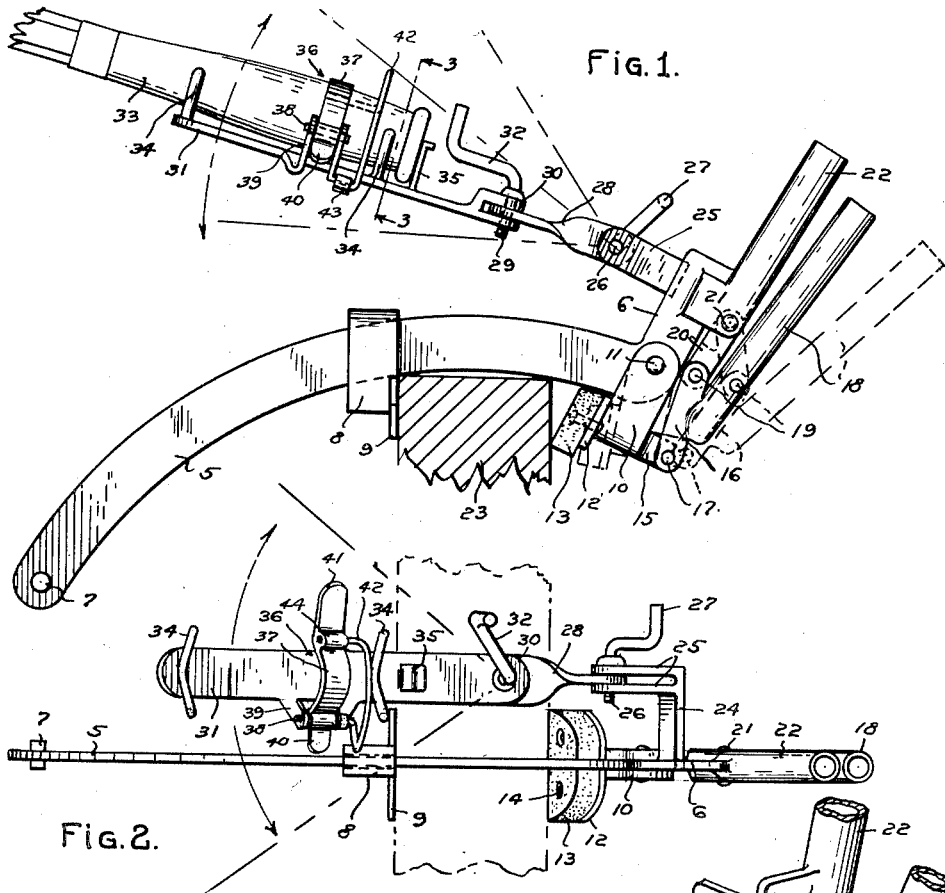
Fig. 1.
Fig. 2.
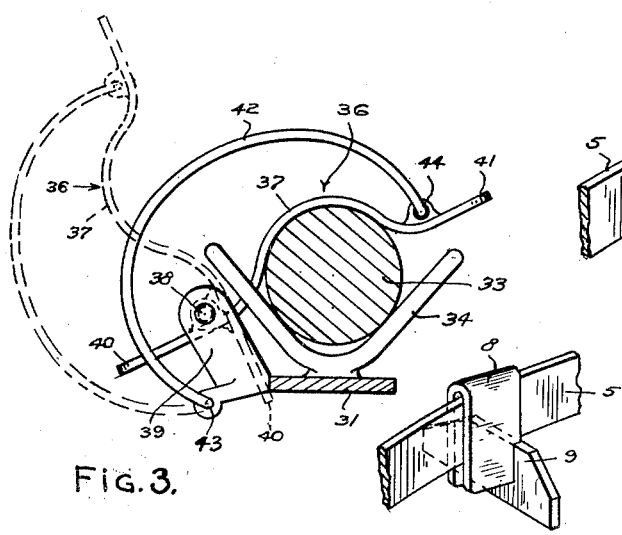
Fig. 3.
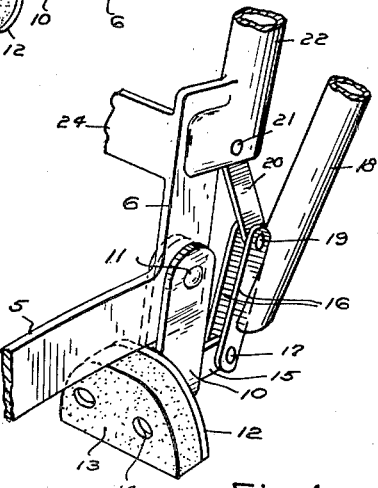
Fig. 4.
Fig. 5.
INVENTOR.
CLAUD L. JACKSON,
BY
ATTORNEY

United States Patent Office 2,707,089
Patented Apr. 26, 1955

2,707,089

UNIVERSAL CLAMP-ON FISHING ROD HOLDER

Claud L. Jackson, Miami, Fla.

Application August 28, 1953, Serial No. 377,140

3 Claims. (Cl. 248—42)

This invention relates to improvements in fishing rod holders and has particular reference to a fishing rod holder that is capable of being securely clamped upon various objects, and with the fishing rod holder being universally adjustable for disposing the rod in various angular positions.

An object of the invention resides in a novel clamp device that is adjustable to have clamping engagement with such objects as a boat, a bridge railing, or even upon the trunk of a tree, with the clamping device being quickly adjustable to the particular object on which it is mounted.

A further object of the invention resides in a novel form of universally mounted support for the butt of the fishing rod whereby the rod is securely held upon the support in a manner to prevent accidental displacement when pressure is exerted thereon, such as would occur when a fish strikes the line and with the support carrying a novel form spring loaded past center clamp that permits of a quick release of the rod by the operator in the event of a fish striking the line.

A further object of the invention resides in the adjustable clamp device that is quickly and easily clamped into position by past center linkage.

Another object of the invention resides in the simplicity of the device and ease of adjustment and the universal adjustment of the rod holder whereby the supported rod may be shifted in a wide range either vertically or horizontally.

Other objects and advantages will be clearly apparent during the course of the following description, reference being had to the accompanying drawings wherein has been illustrated a preferred embodiment of the device and wherein like characters of reference are employed to denote like parts throughout the several figures.

In the drawings:

Figure 1 is a side elevation of a device constructed in accordance with the invention and shown in clamp engagement with a supporting structure, Figure 2 is a plan view of the device, Figure 3 is an enlarged transverse sectional view taken on line 3—3 of Figure 1, Figure 4 is a fragmentary perspective view of a past center linkage and associated clamping device, and Figure 5 is a fragmentary perspective view of an adjustable clamping head.

Referring specifically to the drawings, the numeral 5 designates an elongated arcuate flat bar having one end angularly disposed upwardly as at 6. The opposite end of the bar 5 carries a stop pin 7. Slidably disposed upon the bar 5 is a U-shaped head 8, see particularly Figure 5, and with the head having oppositely disposed wings 9 formed by a cross plate connected thereto. The head 8 and its wings 9 is shiftable along the bar 5 and is prevented from disengagement upwardly by the wings 9 and supported against displacement from the bar by the pin 7. The head 8 is prevented from shifting along the bar 5 when pressure is exerted against the wings 9, by a vertical rocking motion that causes the head portion and the plate to simultaneously bite upon the upper and lower edges of the bar. Pivotally supported upon the bar 5 adjacent the angled portion 6 is a generally U-shaped link 10, pivoted at 11 to have swinging movement with respect to the bar. The link 10 has welded or otherwise connected thereto a plate 12, with the plate extending equidistantly upon opposite sides of the bar 5. Rigidly connected to the forward face of the plate 12 is a cushion pad 13, the connecting screws of which are countersunk as at 14. The pad 13 may be formed of any desirable material, such as rubber or the like. Projecting rearwardly from the link 10 centrally thereof is an apertured ear 15. The ear 15 may be formed integral with the link 10 or it may be welded thereto. Pivotally connected upon opposite sides of the ear 15 are a pair of identical links 16, connected to the ear 15 as at 17. Rigidly connected with the links 16, as by welding, is a handle member 18, through the medium of which the links 16 are rocked upon the pivot 17. Pivotally connected at the upper end of the links 16 as at 19 is a link 20, the opposite end of which is pivotally connected as at 21 to the lower end of a fixed handle 22. The handle 22 may be formed integral with the angled portion 6 or it may be split and welded thereto in any desirable manner. The handle 18 is manually shiftable toward and from the handle 22, and the shifting of the handle 18 serves to rock the link 10 on its pivot 11 to shift the pad 13 toward and from the supporting structure, such as that illustrated at 23 in Figure 1. Movement of the handle 18 toward the handle 22 causes the links 16 and 20 to shift inwardly to a past center position to lock the link 10 and its supported pad 13 in firm engagement with the structure 23. Movement of the handle 18 outwardly away from the handle 22 rocks the links 16 and 20 outwardly, causing the link 10 and its supported pad 13 to shift to disengagement with the structure 23. It should be understood, however, that before the handle 18 is shifted to clamping position, the device is arranged over the supporting structure with the pad against one side and with the clamp 8 manually shifted to engage the opposite side. Movement then of the handle 18 to shift the links to the past center position compresses the pad against the supporting structure to rigidly support the device against accidental displacement. The head 8 when pressure is exerted against the wings 9 will tend to rock upwardly but will be limited in such rocking motion by the engagement of the closed end of the head 8 upon the upper edge of the bar 5 and the engagement of the wings 9 against the lower edge of the bar 5. It will thus be seen that the device is quickly and easily adjusted for clamping engagement upon objects having varying diameters.

Rigidly connected with the angle portion 6 adjacent its upper end is a laterally extending plate 24 welded or otherwise rigidly connected thereto. The plate 24 at its outer end is provided with a pair of spaced apart wings 25 having their free ends rounded and apertured with one wing being threaded for the reception of a clamping screw 26, the screw 26 being rotated through the medium of an off-set handle 27. Swivelled between the wings 25 upon the screw 26 is a link 28 in the form of a flat bar with its opposite ends arranged at an angle of 90 degrees with respect to each other. Through the medium of the wings 25 and the screws 26, the link 28 may partake of vertical swinging movement to be subsequently clamped in adjusted position by the screw 26. The opposite end of the link 28 is apertured for the reception of a clamping screw 29 passing through a knuckle 30 carried by one end of a flat rod supporting plate 31. The screw 29 is controlled by an off-set handle 32. Thus the plate 31 may be adjusted through a wide range in a horizontal plane. The plate 31 may be formed of any desirable length sufficient to support the butt end of a fishing rod illustrated at 33 in Figure 1. The upper surface of the plate 31 is provided with rigid and preferably V-shaped rod cradles 34, see more particularly Figure 3. Rearwardly of the innermost cradle 34 is a stop device 35 that is connected with the plate in any desirable manner and projects upwardly to limit the rearward movement of the rod 33.

Means are provided to securely clamp the rod upon the support 31 in a manner that prevents the displacement of the rod under normal conditions, such as when a fish strikes the line. This means embodies a flat yoke indicated as a whole by the numeral 36. The yoke embodies an arcuate portion 37 that is curved generally to conform to the recognized cylindrical shape of the fishing rod butt. From the arcuate portion 37, the yoke extends to one side of the plate 31 and is hingedly supported at 38 between a pair of wings 39, preferably formed integral with the plate 31 and angled outwardly to dispose the pivotal points 38 to one side of the plate 31. The yoke is further extended outwardly from the pivotal point 38 to form a tail portion 40 that serves to limit the lateral swinging movement of the yoke to a release position for the rod and in this position the tail 40 abuts the edge of the plate 31. At its opposite end the yoke 36 is extended from the arcuate portion 37 to form a finger engagement lip 41, through the medium of which the operator may manually swing the yoke to overlying and clamping engagement with the rod 33. Means are provided to retain the yoke in both the clamping and the release position, comprising an arcuate spring 42, one end of which is pivotally supported adjacent the wings 39 as at 43, while its opposite end is pivotally connected in a lug 44, preferably integral with the upper side of the yoke 36 adjacent the arcuate portion 37. The shifting of the yoke 36 to either the clamping or the release position results in a past center movement controlled by the spring 42. Thus the yoke may be snapped to either position and spring loads the yoke against accidental movement. Since the yoke 36 is spring loaded to both the clamping and release position, the operator may, upon observing a strike upon the line, quickly grab the rod to release it from the support 31 so as to enable him to operate the well-known winding reel. While the spring loading is adequate to securely hold the rod in supported position upon the plate 31, it offers no appreciable resistance to the quick adjustment of the rod by the operator. Thus the operator may quickly and easily release his rod without the necessity of removing the screw or other fixed clamping devices heretofore employed.

In the use of the device, the operator selects a structure upon which the device is to be mounted, such as the side of a boat, a bridge railing or the like and quickly adjusts and clamps the device in position through the medium of the clamping head 8 and the pad 13, it being understood that after the device has been adjusted the handle 18 will be shifted inwardly toward the handle 22 to securely lock the structure in position. The yoke 36 is then manually swung laterally upon its pivot 38 by the lip 41 and against the tension of the spring 42 until it has assumed a past center position with the tail 40 engaging the side of the plate 31. The yoke in this position will remain fixed against accidental shifting. The butt of the rod 33 is then placed within the cradles 34 with its end abutting the stop 35. The operator then swings the yoke in a reverse direction by the lip 41 to cause the arcuate portion 37 to partially embrace the rod and in this position the device has moved to an opposite past center position and under the influence of the spring 42 will be held in such position with the rod securely clamped within the cradles 34. The rod may be angled upwardly or downwardly by first loosening the screw 26 after which the screw is again securely set to secure the support in such position.

Lateral or horizontal swinging movement of the support 31 may be obtained by first loosening the screw 29 after which it may be swung to dispose the rod in the desired direction. After the rod has been accurately positioned, the screw 29 is again set to securely prevent accidental shifting of the plate 31 with respect to the link 28. The operator may thus control two or more rods at the same time, obviously requiring duplicate supporting devices. It is well understood that when a fish strikes the line, the operator must quickly retrieve the rod in order to actuate the reel and the lapse of only a few seconds may result in the fish being lost, and it is with this in mind that the quick release yoke 36 was developed in a manner that permits the operator to quickly and easily release the rod for such operation. Clamp on fishing rod holders are well known in the art but in each instance the rod is clamped by a screw or other device which requires a loss of valuable time by the operator in releasing it.

It will be apparent from the foregoing that a very novel and easily actuated support and clamp on device has been provided, the parts are few and simple and will securely hold the device in operative position upon many different kinds of structures. The device is strong, durable, cheap to manufacture and most effective for the purposes described.

It is to be understood that the invention is not limited to the precise arrangement of parts and their relative positions, but that changes are contemplated as readily fall within the spirit of the invention or the scope of the subjoined claims.

Having described my invention, what I claim as new and desire to secure by Letters Patent is:

1. A fishing rod holder that includes an elongated arcuate clamping bar that is angled upwardly at one end and provided with a stop pin at its opposite end, a clamping head slidable on the bar, a clamping head pivotally connected to the bar adjacent its angled end to swing in opposed relation to the sliding head whereby the heads are in opposed relation to clamp upon opposite sides of a rigid supporting structure, past center links pivotally connected with the pivoted clamping head and with a handle device fixed adjacent the angled end of the bar, a handle device rigidly connected to certain of the links to swing toward and from the fixed handle to shift the links to and from their past center position, the face of the pivoted clamping head provided with a cushioned pad to have compressing clamping engagement with the supporting structure, the links when in the past center position serving to lock the pivoted head in fixed clamping position, an arm formed on the upper end of the angled portion of the bar to project laterally and with the bar at its free end bent at a right angle and provided with a hinge knuckle, a link pivotally supported in the knuckle to swing in a vertical plane, the knuckle provided with a set screw to fix the link against accidental movement, the opposite end of the link bent at a right angle and apertured for pivotal connection with a knuckle formed at one end of an elongated butt supporting plate whereby the plate is shiftable in a horizontal plane, a set screw to fix the plate in horizontal adjusted position, cradle devices carried by the plate for the resting support of the butt, a spring loaded clamp pivotally supported on the plate to partake of arcuate swinging movement toward and from the butt, means to limit the swinging movement of clamp to a release position disposing the clamp in a past center position against accidental movement.

2. The device according to claim 1, wherein the butt clamp embodies a flat rigid yoke that is arcuately formed intermediate its length to have a partial embracing engagement with the butt, wings formed on the plate at one side to project outwardly to pivotally support the yoke to swing to a release position out of the path of the rod butt and with the yoke provided with a tail extension outwardly of the wings to abutt the plate when the yoke is swung to a release position, the spring means being arcuate and pivotally connected at one end adjacent one of the wings and pivotally connected at its opposite end to a lug formed on the yoke adjacent the opposite end, the yoke when shifted to either the clamping or the release position being held in a past center position by the arcuate spring.

3. The device according to claim 1, wherein the cradle devices for the butt are substansitlly V-shaped and spaced apart along the plate to dispose the butt in overlying parallel support upon the plate and in the path of swinging movement of the yoke, an upstanding stop device carried by the plate rearwardly of the innermost cradle for abutting engagement with the end of the rod butt to limit its rearwardly movement in the cradles.

References Cited in the file of this patent

UNITED STATES PATENTS

| | | |
|---|---|---|
| 840,406 | Williams | Jan. 1, 1907 |
| 1,394,529 | Armitage | Oct. 25, 1921 |
| 2,540,584 | Vaycox | Feb. 6, 1951 |
| 2,599,160 | Brauer | June 3, 1952 |